Nov. 10, 1970    R. S. WALTON    3,538,703
ELECTRONIC TIMEPIECE CONSTRUCTION EMPLOYING A FLAT
STEP-BY-STEP ELECTROMECHANICAL ENERGY CONVERTER
Filed May 2, 1968    2 Sheets-Sheet 1
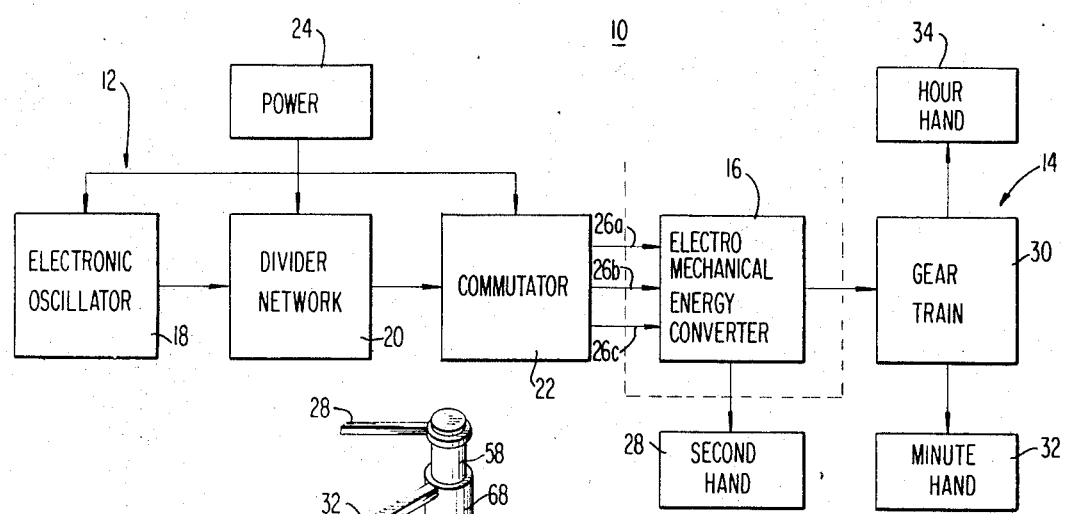
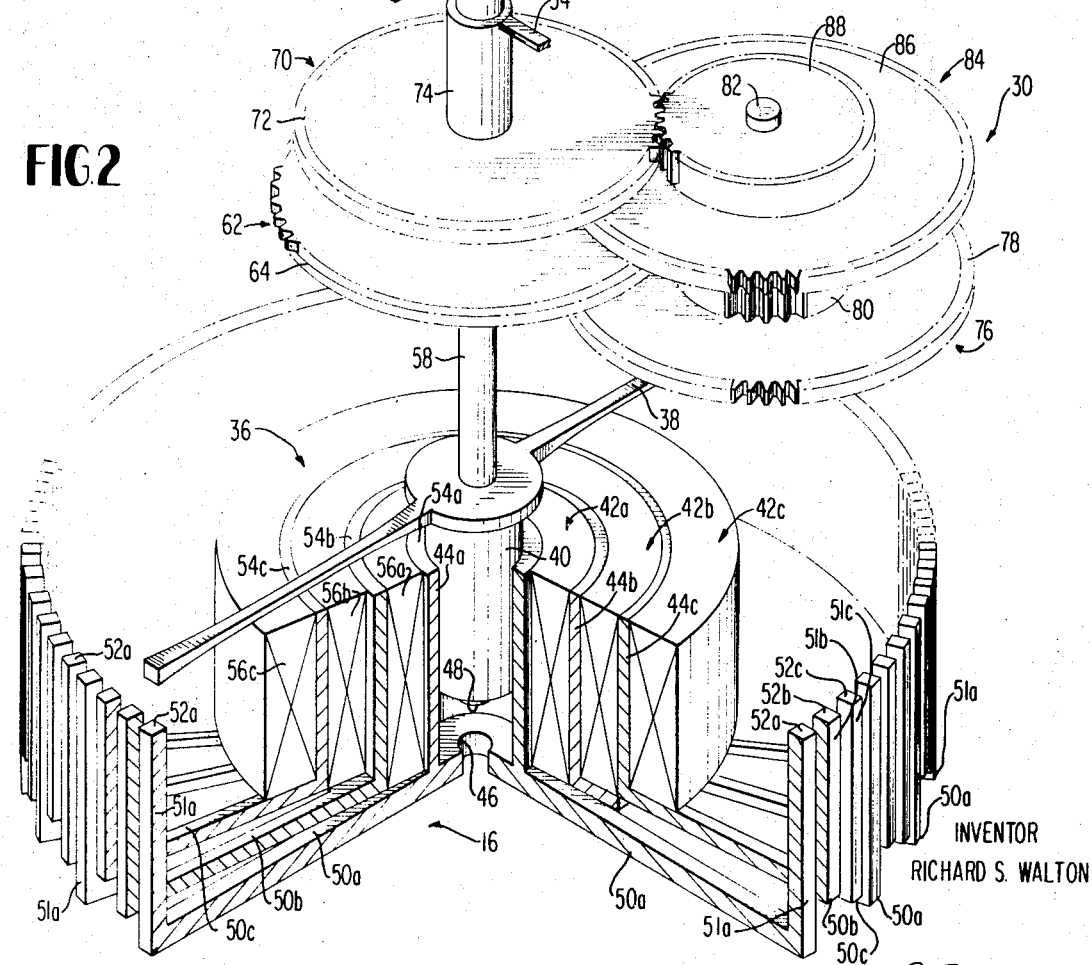
INVENTOR
RICHARD S. WALTON
BY *Le Blanc & Shur*
ATTORNEYS Nov. 10, 1970  R. S. WALTON  3,538,703
ELECTRONIC TIMEPIECE CONSTRUCTION EMPLOYING A FLAT
STEP-BY-STEP ELECTROMECHANICAL ENERGY CONVERTER
Filed May 2, 1968  2 Sheets-Sheet 2
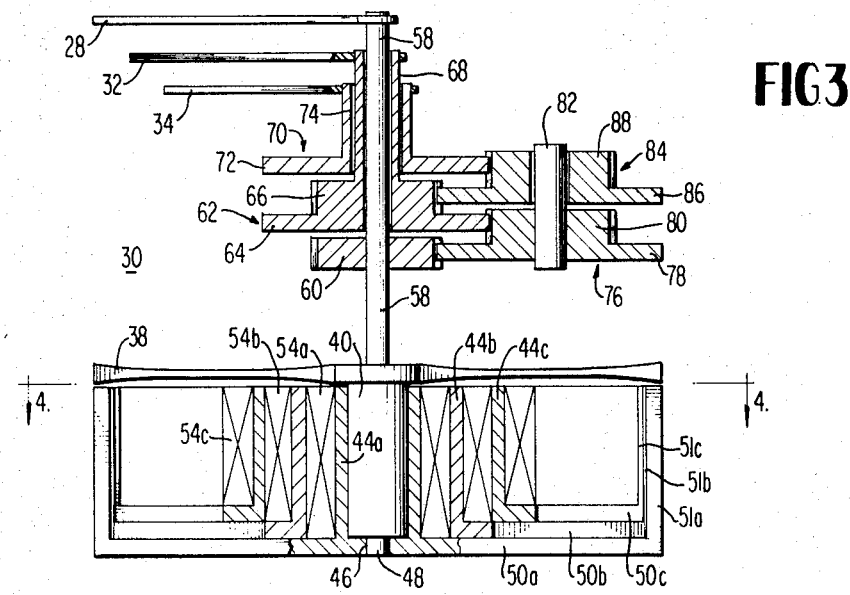
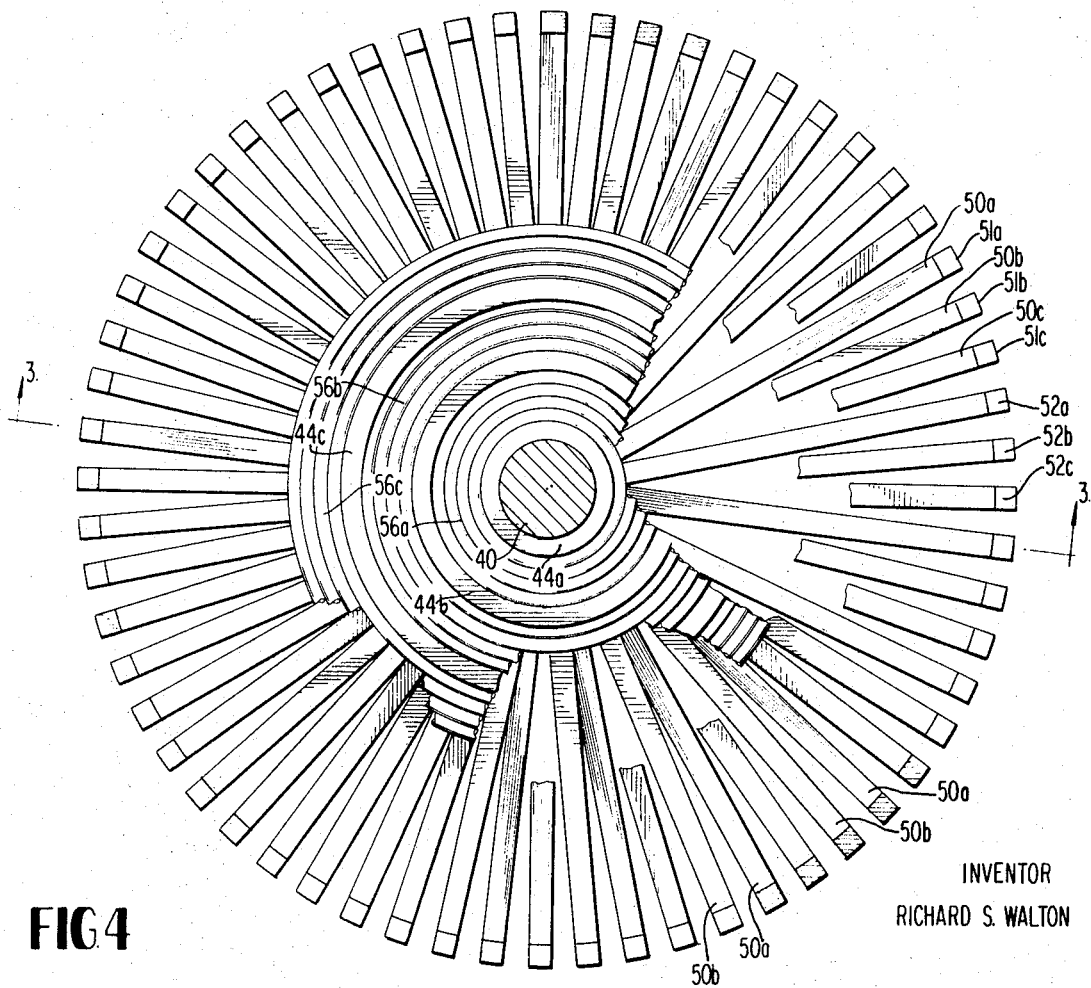
INVENTOR
RICHARD S. WALTON
BY  *Le Blanc & Shur*
ATTORNEYS

United States Patent Office 3,538,703
Patented Nov. 10, 1970

3,538,703
ELECTRONIC TIMEPIECE CONSTRUCTION EMPLOYING A FLAT STEP-BY-STEP ELECTROMECHANICAL ENERGY CONVERTER
Richard S. Walton, Lancaster, Pa., assignor to Hamilton Watch Company, Lancaster, Pa., a corporation of Pennsylvania
Filed May 2, 1968, Ser. No. 726,090
Int. Cl. G04c 3/00
U.S. Cl. 58—23
12 Claims

ABSTRACT OF THE DISCLOSURE

There is disclosed herein an electrical timepiece including electronic circuitry for generating timing pulses, an electromechanical energy converter driven in stepwise fashion by the timing pulses and a mechanical movement having a second hand driven directly by the energy converter and gear train also driven by the energy converter to drive indirectly the hour and minute hands. The electromechanical energy converter disclosed is characterized by a wound stator having a plurality of magnetic circuits separately excitable to complete a magnetic path with a rotor. As the magnetic circuits are energized in succession, the rotor is attracted from one magnetic circuit to the next, producing stepwise rotation in synchronism with the excitation. A particular feature of the energy converter is the fact that its axial dimension is substantially less than its radial dimension, resulting in a flat configuration especially useful in a wrist watch.

---

The present invention relates to a timekeeping device employing electronic signal generating apparatus and an electromechanical energy converter in the form of a discreetly driven electrical-to-mechanical energy converter characterized by a small axial dimension in relation to its radial dimension. This invention also relates to the design and construction, per se of such an electromechanical energy converter.

Considerable effort has been made over the years to devise and perfect small portable timekeeping devices driven by electrical rather than mechanical spring power. Several devices of this type have been marketed successfully. One such device, of the electrically driven-balance wheel regulated type, is shown in Van Horn et al. reissue patent Re. 26,187, dated Apr. 4, 1967 and entitled "Electric Watch."

Watches designed in accordance with the teachings of the Van Horn et al. patent are quite successful commercially but continuing efforts are being made to devise other electronic timekeeping constructions which eliminate the need for balance wheel hairspring regulation. Potential advantages of such new designs include high accuracy with reduced size, simplicity, and potential reduction of cost.

One particular difficulty which has been encountered in efforts to eliminate the balance wheel and hairspring has been in devising suitable means for converting an appropriately generated time signal into a satisfactory visual display. In one approach, dispensing entirely with a rotating mechanical indicator and substituting electronically commutated illuminated display, has been suggested. Difficulties in this area include high power requirements for satisfactorily visible display or alternatively insufficient display visibility for realistically usable power supplies.

Another approach has involved attempts to devise suitable electromechanical energy converters with size and geometry compatible with normal wrist watch construction, and again having realistic power requirements in light of customary wrist watch dimensions and current power supply technology. Unfortunately, it has not heretofore been possible to meet these requirements in a satisfactory manner.

Accordingly, the present invention is intended to overcome these difficulties by providing an improved construction employing electronic circuitry to generate an accurate time signal, and an improved electromechanical energy converter for transforming the time signal to a satisfactory visual display.

One particular aspect of this invention resides in the improved electromechanical energy converter per se. This device is characterized by discrete excitation and response with lower power requirements and an improved geometry, especially satisfactory for use in a wrist watch. Basically, the electromechanical energy converter of this invention is formed of a series of interlaced magnetic circuits arranged to interact successively with a magnetizable rotor to cause the latter to be driven in steps responsive to the electronically generated timing signal.

As to geometry, the improved electromechanical energy converter of this invention is characterized by a stator construction having a plurality of radially elongated arms or spokes terminating in axially disposed fingers. Each magnetic circuit is successively energized by a coil driven by a commutator so that a magnetic path is completed between the energized stator magnetic circuit and the rotor. A principal feature rendering this device especially useful in a wrist watch is the relationship between the arms and fingers of the magnetic circuit and the cooperating rotor whereby the overall axial dimension of the electromechanical energy converter is small in comparison to its radial dimension.

Another principal aspect of this invention resides in the improved electronic watch construction employing the previously described electromechanical energy converter and an electronic circuitry to generate a high accuracy timing signal. An oscillator and associated electronic circuitry generate an accurate timekeeping signal at a frequency of 1.0 Hz. to drive the electromechanical energy converter. This, in turn, directly drives the second hand of the watch while an associated gear train, also driven by the electromechanical energy converter, indirectly drives the minute and hour hands.

The above described construction possesses several advantages. Among these are the elimination of the balance wheel and hairspring and the provision of a relatively simple, compact and accurate electronic timekeeping device with realistically low power requirements. The unique geometry of the electromechanical energy converter permits watch construction of satisfactory thickness and size while the discrete step-by-step operation is conducive to power conservation.

Accordingly, it is a general object of the present invention to provide an improved electrical timepiece construction.

It is a related object of this invention to provide an improved electrical timepiece construction employing a unique electromechanical energy converter.

It is also a related object of this invention to provide an electrically operated watch having a discretely driven display device providing a mechanical time indication.

It is another object of this invention to provide an improved electrical timekeeping device employing an electronic oscillator and associated electronic circuitry for generating an electrical timekeeping signal of high accuracy.

It is also an object of this invention to provide an electrical timekeeping device in which the hands are driven by a gear train and an electromechanical energy converter having a wound stator with a plurality of independently energized magnetic circuits.

It is a related object of this invention to provide an electromechanical timekeeping device in which each magnetic circuit in the electromechanical energy converter is comprised of a plurality of radially extending arms each terminating in an axially extended finger.

It is also a related object of this invention to provide such a timekeeping device in which the overall axial dimension of the electromechanical energy converter is small in comparison to its radial dimension.

It is a further object of the invention to provide an improved discretely operated electromechanical energy converter.

It is also an object of this invention to provide such an electromechanical energy converter formed with a plurality of separately energized magnetic circuits interacting with an elongated bar-like rotor.

It is a further object of this invention to provide an improved electromechanical energy converter having a wound stator comprising a plurality of magnetic circuits each formed of a plurality of radially extended arms terminating in axial fingers, the overall axial dimension of the converter being small in comparison to the radial dimension.

The exact nature of this invention, along with other objects and advantages thereof will become apparent from consideration of the following detailed description and the accompanying drawing in which:

FIG. 1 is an elecromechanical block diagram of a timekeeping device in accordance with this invention;

FIG. 2 is a perspective view of the gear train, hands, and electromechanical energy converter shown schematically in FIG. 1;

FIG. 3 is a vertical composite cross sectional view taken along line 3—3 in FIG. 2 showing details of the construction of the electromechanical energy converter and the gear train; and FIG. 4 is a top plan view showing the layout and details of the construction of the electromechanical energy converter.

Referring to the drawings and particularly to FIG. 1, an electronic timekeeping device such as a watch in accordance with this invention is generally denoted at 10. While this device may be of any desired type, in the following description it will be assumed to be an electronic wrist watch with resulting requirements for small size and lower power consumption.

As illustrated in FIG. 1, the basic functional components of the timepiece of this invention, generally denoted as 10, are divided into an electronic portion 12 and a mechanical portion 14 coupled together by an electromechanical energy converter 16. Electronic portion 12 includes an electronic oscillator 18, a divider network 20, and an electronic commutator 22 fed by a common power source 24 which, for electric wrist watch use, may be one of a number of small commercially available dry cell type batteries.

Electronic oscillator 18 is preferably a crystal controlled high frequency pulse generator of high stability manufactured in integrated circuit form. Oscillator 18 feeds divider network 20 which is preferably an integrated circuit counter device designed to reduce the pulse frequency output of electronic oscillator 18 to a frequency of exactly 1 Hz. Divider network provides the 1 Hz. control signal to commutator 22 comprising a solid state gating circuit, also preferably in integrated circuit form. Commutator 22 serves to sequentially provide the battery power appearing on lead 24 to a series of commutator output leads 26a, 26b, and 26c for driving electromechanical energy converter 16 as described hereinafter. The number of commutator outputs is not limited to three but must be at least two and preferably at least three for most satisfactory operation.

As will be appreciated, oscillator 18, divider network 20, and commutator 22 may preferably be incorporated into a single integrated circuit, the entire circuit being sufficiently small to permit convenient enclosure with the mechanical elements 14 and the electromechanical energy converter 16 in a watch case of customary size and geometry.

The purely mechanical portion 14 of electronic watch 10 includes a second hand 28, a gear train 30, a minute hand 32, and an hour hand 34. Coupling the purely mechanical subsystem 14 to the purely electronic subsystem 12 is electromechanical energy converter 16. As indicated in FIG. 1, second hand 28 is directly driven by converter 16 while minute hand 32 and hour hand 34 are indirectly driven through gear train 30. Also, as illustrated, electromechanical energy converter 16 is operated by the power supply signals appearing on commutator output leads 26a, 26b, and 26c, in a manner described more fully hereinafter.

With reference now to FIG. 2, there is shown the configuration and arrangement with the mechanical components 14 and electromechanical energy converter 16. It should be appreciated that the axial dimensions of the drawing are greatly exaggerated in relation to the radial dimensions for purposes of illustration while the actual construction in accordance with the present invention is characterized by axial dimensions which are quite small in relation to the radial dimensions of the device.

Illustrated in FIG. 2 are the mechanical components including second hand 28, gear train 30, minute hand 32, and hour hand 34 in a suitable operative relationship to electromechanical energy converter 16. Electromechanical energy converter 16 is formed of a wound stator 36 and an elongated bar-like rotor 38 rigidly secured on a rotor shaft 40. Rotor 38 may include a second bar-like member angularly disposed relative to the bar shown.

The details of the construction of electromechanical energy converter 16 are shown in FIGS. 2 through 4. As illustrated, wound stator 36 is comprised of three separate magnetic circuits 42a–42c, coaxially positioned around rotor shaft 40. The radially inner magnetic circuit 42a comprises a hollow cylindrical core 44a. The bottom end of core 44a may be closed, but preferably includes an aperture 46 of small diameter to receive terminal portion 48 of rotor shaft 40. A plurality of arms 50a radiate outwardly from the base of core 44a at equally spaced intervals. The number of arms is determined in accordance with the particular use of the device as explained hereinafter.

Each of arms 50a terminates in an axially upward extending finger 51a extending upwardly a sufficient distance so that the upper surfaces 52a are coplanar with the upper edge 54a of tubular core 44a. In vertical section, arms 50a are preferably of rectangular or square cross section with radially increasing area, i.e., the edges of each of arms 50a is defined by radii of a circle having its center along rotor shaft 40. Correspondingly, in horizontal section, the inner and outer sides of fingers 51a are defined by portions of concentric circles while the remaining sides are parallel to the radii defining the sides of arms 50a.

Wound on a tubular core 44a is a wire coil 56a which serves to generate a magnetic field within magnetic circuit 42a. Coil 56a is connected to lead 26a shown schematically in FIG. 1; as a practical matter, one end of coil 56a may be connected to a single lead 26a from commutator 22 with the other end of the coil being connected to a common return to power supply 24.

Stator 36 also includes second and third independent magnetic circuits 42b and 42c generally similar in construction and configuration to previously described magnetic circuit 42a. Second magnetic circuit 42b comprises a central tubular core 44b open at both ends to permit it to be positioned around magnetic circuit 42a, and a plurality of equally spaced radiating arms 50b. Arms 50b terminate in a plurality of axially upwardly extending fingers 51b. Magnetic circuit 42b is excited by a coil 56b, one end of which is connected to commutator output 26b and the other end of which is connected to a suitable common return to power supply 24.

Likewise, magnetic circuit 42c is formed of a hollow tubular core 44c open at both ends, with equally spaced radiating arms 50c terminating in axially upwardly extending fingers 51c. A third excitation coil 56c is wound around tubular core 44c and is connected at one end to commutator output 26c and at the other end to the common power supply return.

When assembled, magnetic circuits 42a, 42b, and 42c are stacked with arms 50a, 50b, and 50c interlaced. In other words, the arms follow in succession: 50a, 50b, 50c, 50a, 50b 50c, etc. around the stator periphery. The arms are angularly spaced so as not to overlap, thereby defining separate magnetic poles around the periphery of the stator.

The magnetic circuits 42a, 42b, 42c are axially spaced with magnetic circuit 42b resting on arms 50a of magnetic circuit 42a and magnetic circuit 42c resting on arms 50b of magnetic circuit 42b. As a result, to keep upper surfaces 52a, 52b, and 52c of fingers 51a, 51b and 51c, as well as the upper surfaces 54a, 54b, and 54c of hollow tubular cores 44a-44c in coplanar relationship, the actual height of core portion 44a is greater than that of cylindrical portion 44b which in turn is greater than the height of cylindrical portion 44c. Correspondingly, the height of fingers 51a is greater than the height of fingers 51b, which in turn is greater than the height of fingers 51c.

In addition, so that fingers 51a, 51b, and 51c are at the same radial distance from rotor shaft 40, the actual length of arms 50a is greater than that of arms 50b which in turn is greater than that of arms 50c. This compensates for the increased diameter of tubular cores 44a through 44c as will be appreciated. The arc length of each finger, as well as the overall diameter, should be such that a spacing on the order of the arc length is maintained between the fingers to provide satisfactory magnetic isolation and reliable operation.

If rotor 38 is provided with additional bar-like members, the angular disposition should be such that all bars are positioned over fingers 51a, 51b, or 51c of the same magnetic circuit, i.e., so that if one bar interacts with magnetic circuit 42a, at a given time, all other bars interact with the same magnetic circuit at that time.

The diameter of rotor shaft 40 is somewhat smaller than the inside diameter of tubular core 44a to permit free rotation. Any suitable bearing arrangement may be provided; for example, the stepped portion 48 of shaft 40 may be journaled in aperture 46 as illustrated herein. Other suitable bearing arrangements may also be employed.

From the foregoing, it may be seen that energization of one of coils 56a, 56b, or 56c will establish a magnetic field in each of the arms and fingers associated with that coil. If the rotor 38 is adjacent to a pair of fingers of the energized magnetic circuit, a magnetic return path for that circuit will be completed through the rotor. Moreover, the axial orientation of the field as it enters the air gap above surfaces 52a, 52b, and 52c of fingers 51a, 51b, and 51c will draw rotor 38 into alignment with the nearest pair of energized fingers. Thus, sequential energization of coils 56a, 56b, and 56c will draw rotor 38 around continuously in steps and the desired discrete or pulsating operation will be obtained.

In general, at least two distinct magnetic circuits are necessary in order to provide the desired step-wise operation; however, if only two magnetic circuits are used, then the unidirectional motion of rotor 38 is not assured. By providing three or more magnetic circuits, the closest energized pair of fingers in a given magnetic circuit will always attract the rotor in the same direction, assuring that unidirectional motion is maintained. Alternatively, any suitable mechanical means may be provided to assure unidirectional motion; under such conditions, only two separate magnetic circuits are necessary.

While the step-wise electromechanical energy converter described above is of general utility, it is of particular interest for portable time-keeping devices due to the fact that fingers 41a, 51b, and 51c need extend only a small distance axially compared to the radial extent of arms 50a, 50b, and 50c. Thus, an essentially flat configuration, ideally suitable for wrist watch use is achieved.

For such applications, direct drive of the second hand 28 at a rate of 1 r.p.m., or 1 pulse per second with indirect mechanical drive of the minute hand 32 and hour hand 34 may be employed. Since there are three magnetic circuits, for 60 steps per minute of rotor 38, each magnetic circuit must include 20 arms 50a, 50b, and 50c. Obviously, however, other numbers of fingers may be used for different applications.

A suitable mechanism for obtaining the desired direct drive of second hand 28 and indirect drive of minute and hour hands 32 and 34 is illustrated in FIGS. 2 through 4. As shown in FIG. 2, an axial upward extension 58 of rotor shaft 40 transmits power directly from electromechanical energy converter 16 to second hand 28 and gear train 30.

With additional reference to FIGS. 3 and 4, gear train 30 includes a small drive pinion 60 press fitted onto second hand shaft 58 which provides power input from electromechanical energy converter 16. A minute wheel 62 is freely mounted on shaft 58 above drive pinion 60. Minute wheel 62 includes a large toothed portion 64, a central reduced diameter portion 66 constituting a minute wheel pinion, and an upper further reduced diameter tubular portion 68 extending toward the top of shaft 58. Tubular portion 68 provides means for attachment of minute hand 32 in any convenient fashion.

Also freely mounted for rotation on tubular extension 68 above minute wheel pinion 66 is hour wheel 70 including a large diameter toothed portion 72 and an upwardly extending collar portion 74 which provides means for mounting of hour hand 34.

Drive train 30 also includes a first gear 76 having a large diameter base portion 78 and an upper reduced diameter portion 80 constituting a first gear pinion. First gear 76 is mounted on a shaft 82 parallel to but radially displaced from second hand shaft 58. First gear 76 may either be press fitted or freely rotating on shaft 82. Of course, if first gear 76 is press fitted, shaft 82 should be freely mounted in a suitable bearing arrangement to permit rotation. A second gear 84, including a large diameter base portion 86 and a smaller diameter pinion portion 88, is freely mounted on shaft 82. If convenient or desirable, a separate shaft carrying second gear 84 may be provided.

As illustrated, drive pinion 60 meshes with large diameter portion 78 of first gear 76 while attached first gear pinion 80 meshes with and drives large diameter portion 64 of minute wheel 62. Minute wheel pinion 66 meshes with and drives large diameter portion 86 of second gear 84 while second gear pinion 88 meshes with and drives base portion 72 of hour wheel 70.

As previously mentioned, electromechanical energy converter 16 drives rotor 38 and attached second hand shaft 58 and second hand 28 at one revolution per minute. Accordingly, in order to obtain one revolution per hour for minute hand 32 and one revolution per 12 hours for hour hand 34, the combined ratio of drive pinion 60, first gear 76 and minute wheel 62 is 60:1. Correspondingly, the combined ratio of minute wheel 62, second gear 84, and hour wheel 70 is 60:1.

To summarize the operation of the above-described system, assume that oscillator 18 is adjusted to run at 1,028 pulses per second. In that case, divider network 20 may include 10 binary stages with the result that a divider output is provided once for every $2^{10}$ pulses, i.e., once per second. The 1 Hz. pulses provided to commutator 22 successively actuates one of leads 26a, 26b, and 26c, thereby successively actuating one of magnetic circuits 42a, 42b and 42c.

At a given instant, assume that rotor 38 is positioned as illustrated in FIG. 2 directly above a pair of fingers 52a. Thus, if magnetic circuit 42a is actuated, a magnetic path will be completed through rotor 38. But since the latter is already aligned with the actuated magnetic circuit, no motion will result.

However, upon actuation of magnetic circuit 42b, the adjacent pair of fingers 51b will be actuated, resulting in a clockwise attraction for rotor 38. As a result, the rotor is stepped from the pair of fingers 51a to the adjacent pair of fingers 51b. Correspondingly, upon energization of magnetic circuit 42c, the next adjacent set of fingers 51c will attract rotor 38. Successive energization of magnetic circuits 42a, 42b, and 42c result in the desired stepwise rotary motion.

The result is a direct drive of second hand 28 through second hand shaft 58 and an indirect drive of minute and hour hands 32 and 34, respectively, through gear train 30.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A timekeeping device comprising electronic circuit means for generating periodic timing pulses; mechanical means for producing a time display in seconds, minutes, and hours; and an electromechanical energy converter comprising a rotatable shaft coupled to said mechanical display means, a rotor mounted on said shaft and a stator coupled to said electronic circuit means; said stator including a plurality of separate and independent magnetic circuits adapted to be energized successively in response to said timing pulses to interact with said rotor to cause the latter to be driven step-wise in synchronism with said periodic timing pulses; each of said stator magnetic circuits including radially extending first portions and an axially disposed second portion at the end of each first portion, the radial extent of said first portions being substantially greater than the axial extent of said second portions providing an overall flat geometry for said energy converter.

2. A timekeeping device as defined in claim 1 wherein said timing pulses are generated at a rate of one pulse per second.

3. A timekeeping device as defined in claim 1 wherein each of said stator magnetic circuits includes a coil coaxially mounted with said rotatable shaft; and means for coupling magnetic energy from the coil to the radially extending first portion of the magnetic circuit associated with that coil.

4. A timekeeping device as defined in claim 3 including commutator means separately coupled to each of said coils, said commutator means being operative to energize said coils one at a time in succession in response to successive occurrences of said timing pulses.

5. A timekeeping device as defined in claim 4 wherein said coupling means comprises a hollow core of magnetizable material upon which the respective one of said coils is wound.

6. A timekeeping device as defined in claim 1 wherein each of said magnetic circuits includes a hollow core of magnetizable material, a coil wound on each core, said cores being positioned coaxially about said rotor shaft, with the inner of said cores having an inside diameter slightly in excess of that of the rotor shaft and with the inside diameter of each succeeding hollow core being sufficiently greater than that of the adjacent inner core to accommodate said adjacent inner core therein with its associated coil.

7. A timekeeping device as defined in claim 6 wherein said stator magnetic circuits are stacked upon each other so that the magnetic circuit whose core portion lies closest to the rotor axis forms a base with the radially inner portions of each of the remaining magnetic circuits resting on the adjacent inner magnetic circuit, said magnetic circuits being angularly positioned with respect to each other so that the axially disposed second portions at the ends of said radially extending first portions are angularly spaced in nonoverlapping relationship.

8. A timekeeping device as defined in claim 1 wherein each of the magnetic circuits of said electromechanical energy converter includes a central portion mounted coaxially with said rotor shaft; means responsive to said timing pulse to induce a magnetic field into each of said central portions in succession; wherein said radially extending first portions are formed by a plurality of angularly spaced radial arms extending outwardly from said central portion; and wherein said axially disposed second portions are formed by a plurality of axial fingers at the outer ends of said arms, the lengths of said fingers being substantially less than the length of said arms.

9. A timekeeping device as defined in claim 8 wherein said central portions comprise a series of hollow cylindrical cores of increasing inside diameter coaxially mounted around said rotor shaft.

10. A timekeeping device as defined in claim 9 including commutator means; and a coil wound on each of said hollow cores, the commutator being connected to each of said coils; said commutator being responsive to said timing pulses to energize each of said coils one at a time in succession in synchronism with said timing pulses.

11. A timekeeping device as defined in claim 1 wherein said timing pulses are generated at a rate of one pulse per second, wherein said stator includes at least two separate magnetic circuits; and wherein the total number of radially extending first portions on all of said magnetic circuits is 60.

12. A timekeeping device as defined in claim 1 wherein said mechanical display means includes a second hand, a minute hand, and an hour hand; said second hand being directly coupled to said electromechanical energy converter; and further including a gear train coupled to said electromechanical energy converter and for driving said minute hand and said hour hand at the proper speed in relation to said second hand.

References Cited

UNITED STATES PATENTS 3,250,066   5/1966   Engelhardt et al. _____ 58—23

RICHARD B. WILKINSON, Primary Examiner

E. C. SIMMONS, Assistant Examiner

U.S. Cl. X.R.

310—46

PO-1050
(5/69)

UNITED STATES PATENT OFFICE
CERTIFICATE OF CORRECTION

Patent No. 3,538,703                     Dated   November 10, 1970

Inventor(s)   RICHARD S. WALTON

It is certified that error appears in the above-identified patent and that said Letters Patent are hereby corrected as shown below:

Column 1, lines 35 and 36, "discreetly" should read -- discretely --.
Column 6, line 4, "41a" should read -- 51a --

Signed and sealed this 20th day of April 1971.

(SEAL)
Attest:

EDWARD M. FLETCHER, JR.                  WILLIAM E. SCHUYLER, JR.
Attesting Officer                        Commissioner of Patents